Feb. 4, 1941.                L. J. PETTETT                2,230,846
                   PORTABLE SEED AND FERTILIZER DRILL
                   Filed Oct. 19, 1939          2 Sheets-Sheet 1
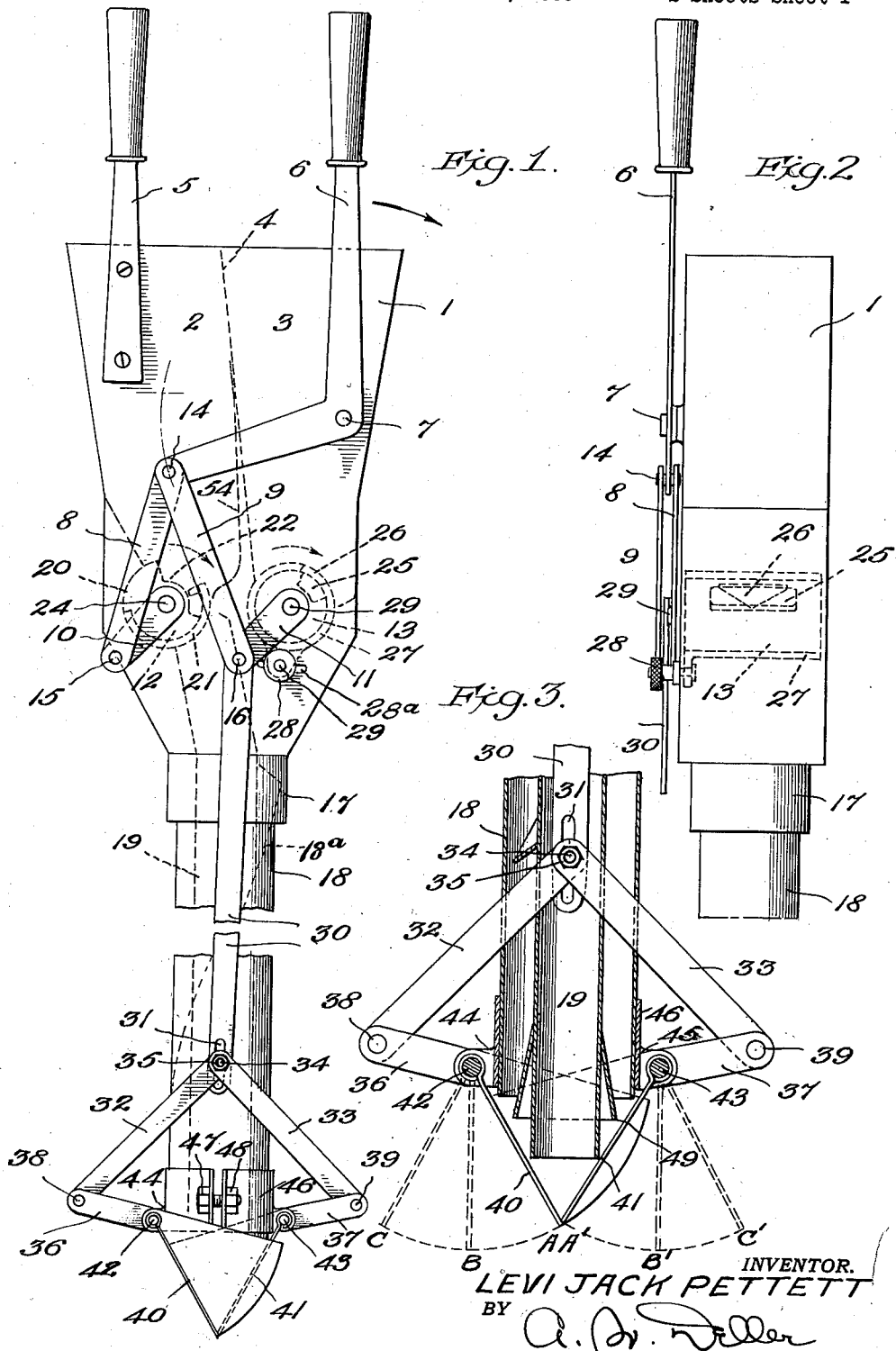
INVENTOR.
LEVI JACK PETTETT
BY
ATTORNEY.

Feb. 4, 1941.  L. J. PETTETT  2,230,846
PORTABLE SEED AND FERTILIZER DRILL
Filed Oct. 19, 1939  2 Sheets-Sheet 2
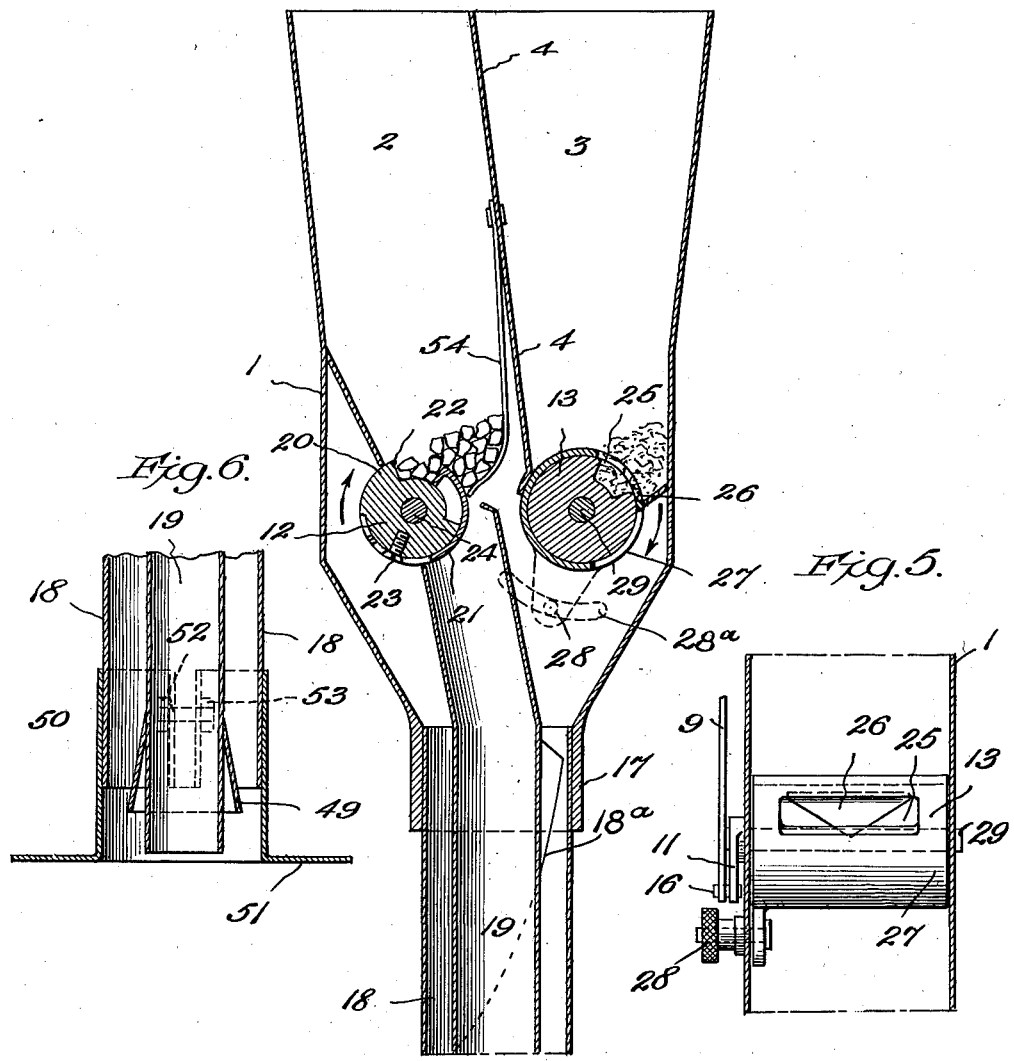
INVENTOR
LEVI JACK PETTETT
BY
ATTORNEY Patented Feb. 4, 1941

2,230,846

UNITED STATES PATENT OFFICE 2,230,846

PORTABLE SEED AND FERTILIZER DRILL

Levi Jack Pettett, Lockland, Ohio

Application October 19, 1939, Serial No. 300,196

6 Claims. (Cl. 111—95)

The present invention relates to portable seed drills, and more particularly to a portable seed drill capable of depositing seed substantially uncontaminated by fertilizer but practically simultaneously therewith.

It is an object of the present invention to provide a portable seed drill capable of depositing seed and fertilizer practically simultaneously, in which the seed is substantially uncontaminated by the fertilizer.

It is another object of the present invention to provide a portable means for depositing fertilizer and seed in such manner that substantially all the fertilizer is equi-distant from the seed but not in contact therewith.

It is a further object of the present invention to provide a portable dropping mechanism for both seed and fertilizer with positive control through a common element.

Other objects and advantages will become apparent to those skilled in the art from the following description, taken in conjunction with the accompanying drawings, in which:

Fig. 1 is a side elevation of an embodiment of the present invention;

Fig. 2 is an end elevation of the upper portion of the embodiment illustrated in Fig. 1;

Figure 3 is an enlarged front elevational view of the lower end of a preferred embodiment of the present invention showing the tubular supporting member in section for the sake of clarity;

Fig. 4 is a vertical sectional view of a portion of an embodiment of the present invention showing seed and fertilizer metering devices;

Fig. 5 is a detail sectional view showing a side elevation of a fertilizer metering device; and Fig. 6 is a vertical sectional view of the discharge end of an embodiment of the present invention capable of depositing seed and fertilizer at substantially the same ground level.

Broadly stated, my improved portable seed drill includes hoppers or bins serving as reservoirs for seed and fertilizer, together with suitable conduits for conveying the seed and the fertilizer from the storage bins to the site of deposition. Disposed in each conduit is a closure means for interrupting the movement of seed and fertilizer from the storage bins to the site of deposition. These closure means are operated by a common element. A hand grip is provided on the drill to enable the operator to carry the drill conveniently from place to place, and to enable the operator to hold it firm when actuating the closure means. An important feature of my improved portable seed drill and fertilizer distributing mechanism is the means, such as disclosed in my U. S. Patent No. 2,153,991 granted April 11, 1939, whereby the deposition of the fertilizer substantially in the form of a ring is secured. Furthermore, through the actuation of the closure means, which preferably take the form of the cylindrical valves, through one element, it is possible to deposit the seed and fertilizer substantially simultaneously. As a result of the unique structure provided by my portable seed drill, the seed is placed at the site of planting in such a manner that each particle of the seed is substantially equidistant from the fertilizer. In this manner advantage is taken of the latest investigations concerning the effect of various variables on the efficiency of a given amount of fertilizer.

In order that those skilled in the art may have a better understanding of my improved portable seed drill and fertilizer distributor, a description of a preferred embodiment is given here below for illustrative purposes.

In Fig. 1 is illustrated a preferred embodiment of my portable seed and fertilizer distributing device. A suitable casing 1 is divided into a plurality, for example two, compartments or hoppers 2 and 3 by means of a partition 4. A means for lifting the seed drill or for holding it steady during operation, such as handle 5, is provided. An actuating means or lever 6 is likewise provided for actuating the seed and fertilizer metering devices as well as assisting in the movement of the drill from place to place. Handle 5 and lever or handle 6 may be positioned on the same side of casing 1 or on opposite sides of casing 1. Lever 6 is pivoted on pin 7 and by means of links 8 and 9 and arms 10 and 11 rotates seed metering device 12 and fertilizer metering device 13 through a predetermined angle. Links 8 and 9 are pivoted on handle 6 by means of pin 14, while arm 10 is pivoted to link 8 by means of pin 15 and arm 11 is pivoted to link 9 by means of pin 16. At the lower end of casing 1 a sleeve 17 is provided in which conduit or tubular support 18 is secured to casing 1. Baffle 18a is mounted as a spiral on casing 19 and is secured thereto by conventional means. Baffle 18a insures that in passing down through casing 18, the fertilizer will be evenly distributed around the entire inner periphery of casing 18. Of course, casing 1 and tubular support 18 may be made in one piece. Conduit 18 serves not only as a base or support for casing 1 but also provides a tubular means for delivering a predetermined quantity of fertilizer to the soil in the immediate vicinity of the seed as deposited. Within tubular support 18 and preferably concentric therewith is secured a casing 19 by means of which a predetermined quantity of seed is delivered to the ground within the encircling deposit of fertilizer. The seed metering device 12 also serves as a closure means for hopper 2. Closure means 12 or seed metering device 12 comprises a metering cylinder 20 provided with an adjustable segment 21 by means of which the volume of seed cavity 22 may be adjusted to deliver a predetermined quantity of seed at each positive operation of handle 6. After adjustment of the volume of seed cavity 22, segment 21 is secured in position by means of screw 23 (Fig. 4). Seed metering cylinder 20 is mounted on shaft 24, which is journaled in position in the side walls of hopper 2. Arm 10 is attached to shaft 24 and, as those skilled in the art will readily understand, movement of handle 6 to the right in Fig. 1 rotates said metering cylinder 12 in a clockwise direction through a predetermined arc.

Fertilizer metering cylinder 13 provides a closure means for fertilizer hopper 3 and is mounted on shaft 29. Shaft 29 is, of course, journaled in the sides of fertilizer hopper 3. Fertilizer metering cylinder 13 likewise is provided with a cavity 25 into which a metered quantity of fertilizer drops prior to the rotation of fertilizer metering cylinder 13. The volume of fertilizer fed to cavity 25 is regulated by means of a triangular-shaped orifice 26 in rotatably mounted sleeve 27 which is locked in position by means of screw 28 slidably mounted in arcuate slot 28a. Arm 11 is securely fixed to shaft 29 of the fertilizer metering cylinder and pivotally attached to link 9 by means of pin 16.

A link 30 is likewise pivoted on pin 16 and actuated by handle 6 through link 9. In the vicinity of the lower end of link 30 a slot 31 is provided for the adjustable attachment of links 32 and 33. Links 32 and 33 are pivotally mounted on pin or bolt 34, which may be moved in slot 30 and secured at a predetermined position therein by means of a nut (not shown) or any similar device. Links 32 and 33 are merely retained on bolt 34 by means of a nut or similar device 35. At the outer extremities of links 32 and 33, arms 36 and 37 are pivotally mounted on pins 38 and 39, respectively. Soil opening devices 40 and 41 are rigidly secured to the extremities of arms 36 and 37. Arms 36 and 37 together with the extensions, to wit: soil opening devices 40 and 41, are pivoted on shafts 42 and 43 mounted in ears 44 and 45 on collar 46. Collar 46 is secured to tubular support 18 by the compressive force exerted by bolt 47 and nut 48 or similar means. In the vicinity of the lower end of said seed delivering conduit or casing 19 is attached a cone-shaped baffle 49 positioned with the base of the cone downward. By the provision of baffle 49 contamination of the seed by the fertilizer is obviated.

When for any reason it is unnecessary to deposit the seed and fertilizer below the surface level of the ground, the ground openers 40 and 41 together with the actuating links and arms may be dispensed with and a footing or auxiliary support 50 (Fig. 6) attached to tubular support 18. Footing 50 is provided with a flange 51 at a suitable angle with the upright portion of auxiliary footing 50 and is frictionally secured to tubular support 18 by means of a bolt 52 and nut 53 or other similar means.

In my preferred embodiment of my novel portable seed drill, I prefer to provide a resilient baffle 54 within the seed hopper 2. Baffle 54 preferably is of spring steel or similar material and mounted near the upper portion of partition 4. By means of baffle 54, anchored near the top of hopper 2 for convenience in adjusting, seed cavity 22 of seed metering cylinder 20 does not crush the seed as the seed metering cylinder rotates into the discharge position.

The operation of my novel portable seed drill will be readily understood from the following description. Seed, such as corn, quartered potatoes and the like, is placed in seed hopper 2 after adjusting seed cavity 22 to deliver a predetermined quantity of seed by rotating segment 21 and securing it in position by tightening screw 23. The volume of the cavity 25 in fertilizer metering cylinder 13 is adjusted to deliver a predetermined quantity of fertilizer by increasing or decreasing the area of the orifice of the cavity 25 by suitable movement of sleeve 27. After locking rotatable sleeve 27 in position by means of screw 28, a siutable quantity of fertilizer is introduced into hopper 3. After positioning the portable seed drill at a suitable place, the operator moves handle 6 to the right as indicated in Fig. 1.

With the handles in the position shown in Fig. 1 the metering cylinders 13 and 20 are in the charge position and the soil-opening devices 40 and 41 are in the closed or soil-entering position. The first movement of handles 6 to the right initiates the movement in opposite directions of soil-opening devices 40 and 41 to positions B and B' Fig. 3. Simultaneously the angular displacement of the metering cylinders 13 and 20 is initiated. With continued movement of handles 6 to the extreme right, the opening up of the ground is completed and members 40 and 41 reach the positions C and C' Fig. 3 and the contents of the metering cavities 22 and 25 are discharged into the distributing means 18 and 19. With return of handles 6 from the extreme right to the original position accompanied by retraction of the drill, the soil-opening devices 40 and 41 return to the closed position and the metering cylinders 13 and 20 are angularly displaced in an anti-clockwise manner to the charge position. The movement of this handle to the extreme outer position rotates said metering cylinder 20 and fertilizer metering cylinder 13 through a predetermined angle discharging seed from metering cavity 22 and fertilizer from metering cavity 25. The seed drops into the inner conduit 19 while the fertilizer is discharged into outer conduit 18, thereby causing the seed to fall practically in the center of a ring of fertilizer. Baffle 49 insures the complete separation of seed and fertilizer. Returning handle 6 to the position shown in Fig. 1, i. e., its normal position, allows seed and fertilizer cavities to fill with a predetermined amount of seed and fertilizer and be in position for the next deposition of both.

Although the present invention has been described in conjunction with a preferred embodiment thereof, modifications and variations may be made as those skilled in the art will readily understand. Thus, handles 5 and 6 may be on opposite sides of casing 1 and, instead of being in the vertical position normally, may be positioned horizontally or otherwise. Furthermore, the resilient baffle 54 may be non-resilient without vitiating the underlying principles of the present invention. Such variations and modifications are to be considered within the purview of the specification and scope of the present claims.

I claim:

1. A portable seed and fertilizer distributor comprising a casing divided into a seed bin and a fertilizer bin; angularly displaceable seed metering means in said seed bin; angularly displaceable fertilizer metering means in said fertilizer bin; a first tubular member supporting said casing and being adapted to deposit fertilizer from said fertilizer bin at the side of planting as an annulus; a collar mounted on said first tubular member in the region of the lower extremity thereof and having two shafts mounted thereon at diametric points with the longitudinal edges of the shafts tangential to the outer periphery of said collar, the axis of said shafts being substantially normal to the vertical axis of said first tubular member; a soil-opening member pivotally mounted on each of said shafts, said soil-opening members being of sufficient length in the direction parallel to the vertical axis of said first tubular member to meet at a point in the extension of the vertical axis of said first tubular member and to form thereby a soil-entering member, said soil-entering member being adapted to enter the soil of a prepared seed bed; at least one arm rigidly secured to each of said soil-opening members and adapted to turn said soil-opening members on said shafts; a second tubular member within and concentric with said first tubular member and adapted to convey seed from said seed bin to the site of planting, said second tubular member extending sufficiently beyond the lower extremity of said first tubular member to be in close proximity with said soil-opening members when said soil-opening members are in position to form said soil-entering member; a truncated cone mounted on the outer periphery of said second tubular member and concentric therewith, the base of said truncated cone being beyond the plane of the lower extremity of said first tubular member but short of the plane of the lower extremity of said second tubular member, said truncated cone being arranged to maintain seed and fertilizer separate during planting; a hand grip mounted on a wall of said seed bin; a second hand grip pivotally mounted on an outer wall of said fertilizer bin; means mounted on said angularly displaceable seed and fertilizer metering means and on the arms of said soil-opening members adapted to be actuated by said second hand grip whereby in one continuous movement said soil-opening members are displaced away from each other to open the soil of a prepared seed bed and said seed and fertilizer metering means are angularly displaced to discharge seed and fertilizer into said tubular members to deposit seed and fertilizer in the opening in the prepared seed bed made by said soil-opening members.

2. A portable seed and fertilizer distributor comprising a seed bin and a fertilizer bin having a common wall; a tubular extension of the outer walls of said seed and fertilizer bins arranged to support said bins and adapted to convey fertilizer from said fertilizer bin to the site of planting; means in said tubular extension whereby said fertilizer is distributed around the inner periphery of said tubular extension; angularly displaceable seed metering means in said seed bin; angularly displaceable fertilizer metering means in said fertilizer bin; two shafts mounted at diametric points on said tubular extension in the region of the lower extremity thereof, the longitudinal axes of said shafts being substantially normal to the vertical axis of said tubular extension and being parallel to the tangent drawn through said diametric points; a soil-opening member rotatably mounted on each of said shafts, said soil-opening members being of sufficient length in the direction parallel to the vertical axis of said first tubular member to meet at a point in the extension of the vertical axis of said first tubular member and to form a soil-entering member, said soil-entering member being adapted to enter the soil of a prepared seed bed; at least one arm rigidly secured to each of said soil-opening members and adapted to rotate said soil-opening members on said shaft; a tubular member within and concentric with said tubular extension and adapted to convey seed from seed metering means to the site of planting, said tubular member extending sufficiently beyond the lower extremity of said tubular extension to be in close proximity with said soil-opening members when said soil-opening members are in position to form said soil-entering member; a truncated cone mounted on the outer periphery of said tubular member and concentric therewith, the base of said truncated cone being beyond the plane of the lower extremity of said tubular extension but short of the plane of the lower extremity of said tubular member, said truncated cone being arranged to maintain seed and fertilizer separate during planting; a hand grip mounted on said seed bin; a second hand grip pivotally mounted on an outer wall of said fertilizer bin; means mounted on said angularly displaceable seed and fertilizer metering means and on the arms of said soil-opening members adapted to be actuated by said second hand grip whereby said soil-opening members are displaced away from each other to open the soil of a prepared seed bed and said seed and fertilizer metering means are angularly displaced to discharge seed and fertilizer into said tubular member and said tubular extension to deposit seed and fertilizer in the opening in the prepared seed bed made by said soil-opening members.

3. A portable seed and fertilizer distributor comprising a seed bin and a fertilizer bin, a conduit-like member supporting said seed and fertilizer bins and adapted to distribute fertilizer from said fertilizer bin to the site of planting; means in said conduit-like member constructed and arranged to spread said fertilizer around the inner periphery of said conduit-like member, a second conduit-like member within said first conduit-like member adapted to convey seed from said seed bin to the site of planting; said second conduit-like member extending beyond the lower extremity of said first conduit-like member; two angularly displaceable soil-opening members mounted in close proximity to the lower extremity of said second conduit-like member and meeting at a point in the extension of the vertical axis of said second conduit-like member to form a wedge-shaped soil-entering member; at least one arm secured to each of said soil-opening members and adapted to angularly displace said soil-opening members; a cone-like member mounted on said second conduit-like member in the lower portion thereof and concentric therewith adapted to maintain seed and fertilizer separate during planting and arranged to spread fertilizer around the inner periphery of said first-conduit-like member, the base of said cone-like member being below the plane of the lower extremity of said first conduit-like member but above the plane of the lower extremity of said second conduit-like member; angularly displaceable seed metering means in said seed bin; angularly displaceable fertilizer metering means in said fertilizer bin; a hand grip mounted on said seed bin; a second hand grip pivotally mounted on said fertilizer bin; means mounted on said seed and fertilizer metering means and on the arms of said soil-opening members adapted to be actuated by said second hand grip whereby said soil-opening members are angularly displaced away from each other to open the soil of a prepared seed bed and said seed and fertilizer metering means are angularly displaced to discharge seed and fertilizer into said conduit-like members to deposit seed and fertilizer in the opening in the prepared seed bed made by said soil-opening members.

4. A portable seed and fertilizer distributor comprising a casing having one portion adapted to form separate seed and fertilizer bins and having the lower portion adapted to support said casing in a vertical position and to convey fertilizer from said fertilizer bin to the site of planting; means in said casing adapted to spread fertilizer around the inner periphery of the lower portion of said casing, a conduit-like member having at least the lower portion thereof within the fertilizer conveying portion of said casing and extending beyond the lower extremity of said casing, said conduit-like member being adapted to convey seed from said seed bin to the site of planting; angularly displaceable means for opening the soil of a prepared seed bed, each of said means comprising a plate-like portion extending below the lower extremity of said casing and an arm rigidly mounted on said plate-like portion and adapted to angularly displace said plate-like portion; a hand grip mounted on said casing; a second hand grip pivotally mounted on said casing in the portion forming said seed and fertilizer bins; a plurality of links pivotally mounted on said hand grip, said links including at least one link pivotally mounted on an extension of said hand grip and a second link pivotally mounted on the first link; said second link having a slot in the region of the lower extremity thereof and extending along the long axis of said second link; a link pivotally mounted near the outer extremity of each of the arms of the means for opening the soil of a prepared seed bed and adapted to be pivotally mounted in said slot in a predetermined position; angularly displaceable seed metering and fertilizer metering means mounted in said seed bin and fertilizer bin respectively; an arm mounted on each of said seed and fertilizer metering means; a link pivotally mounted at one end on each of the arms of said metering means and at the other end pivotally mounted on said pivotally mounted hand grip and adapted to angularly displace said seed and fertilizer metering means whereby movement of said pivotally mounted hand grip angularly displaces said soil-opening means to open the soil of a prepared seed bed and angularly displaces said seed and fertilizer metering means to discharge seed and fertilizer into said conduit-like member and said casing to be conveyed to the said opening in said prepared seed bed.

5. A portable seed and fertilizer distributor comprising a seed bin having discharge port in the lower portion thereof; a fertilizer bin having a discharge port in the lower portion thereof; angularly displaceable seed metering means adapted to close said seed bin discharge port and arranged to meter seed and discharge said metered seed from said seed bin; angularly displaceable fertilizer metering means mounted in said fertilizer bin discharge port adapted to close said fertilizer bin discharge port and arranged to meter fertilizer and discharge said metered fertilizer from said fertilizer bin; a conduit-like supporting member subtended from said seed and fertilizer bins and adapted to receive fertilizer from said fertilizer metering means and arranged to discharge said fertilizer to a seed bed; a second conduit-like member, the lower portion at least of which is within said first conduit-like member, said second conduit-like member being adapted to receive seed from said seed metering means and discharge said seed in close proximity to said discharged fertilizer and at substantially the same ground level; a hand grip mounted on said bins, adapted to hold said bins and supporting conduit-like member substantially vertical during operation; a second hand grip pivotally mounted on said bins and adapted to angularly displace said seed and fertilizer metering means; and a base member mounted in the region of the lower extremity of said first conduit-like member and extending beyond the plane of the lower extremity of said first conduit-like member, said base member being adapted to prevent entrance of said first conduit-like member into the soil of a seed bed more than a negligible distance.

6. A portable seed and fertilizer distributor comprising a casing; a fertilizer bin and a seed bin within said casing and having a common wall; a resilient baffle mounted on said common wall and adapted to form the lower portion of a wall and a part of the bottom of said seed bin; a discharge port formed by the free end of said resilient baffle and the lower portion of the opposite wall of said seed bin; angularly displaceable seed metering means mounted in said seed bin discharge port; a discharge port in the bottom of said fertilizer bin; angularly displaceable fertilizer metering means mounted in said discharge port adapted to meter fertilizer and arranged to close said discharge port and to discharge metered fertilizer; a conduit-like supporting member subtended from said fertilizer bin and adapted to receive metered fertilizer and to discharge the same at the site of planting; a baffle mounted in said conduit-like member constructed and arranged to spread fertilizer around the inner periphery of said conduit-like member, a second conduit-like member adapted to receive metered seed and to discharge said metered seed in proximity to said discharge fertilizer and at substantially the same ground level; said second conduit-like member having the lower portion at least within said first conduit-like member and extending beyond the plane of the lower extremity of said first conduit-like member; means mounted in the lower region of said second conduit-like member adapted to maintain seed and fertilizer separate during planting and arranged to spread fertilizer around the inner periphery of said first conduit-like member; a base member mounted in the region of the lower extremity of said first conduit-like member and extending slightly beyond the plane of the lower extremity of said second conduit-like member, said base member being adapted to prevent entrance of said second conduit-like member into the soil of a seed bed more than a negligible depth; a hand grip mounted on said casing and adapted to provide means to hold said casing steady during operation; a second hand grip pivotally mounted on said casing and adapted to angularly displace said seed and fertilizer metering means whereby seed and fertilizer are discharged substantially simultaneously at substantially the same ground level without substantial contamination of the seed by the fertilizer.

LEVI JACK PETTETT.